(12) United States Patent
Vemuri et al.

(10) Patent No.: US 8,930,620 B2
(45) Date of Patent: Jan. 6, 2015

(54) HOST DISCOVERY AND HANDLING OF ALUA PREFERENCES AND STATE TRANSITIONS

(75) Inventors: Hari Krishna Vemuri, Pune (IN); Tushar Ravindranath Gosavi, Maharashtra (IN); Neha Rajendraprasad Gandhi, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 512 days.

(21) Appl. No.: 12/945,467

(22) Filed: Nov. 12, 2010

(65) Prior Publication Data
US 2012/0124312 A1 May 17, 2012

(51) Int. Cl.
*G06F 3/06* (2006.01)
*G06F 11/20* (2006.01)

(52) U.S. Cl.
CPC .......... *G06F 11/2092* (2013.01); *G06F 11/201* (2013.01); *G06F 3/0613* (2013.01); *G06F 3/0635* (2013.01); *G06F 3/067* (2013.01)
USPC ......................................... 711/114; 714/4.21

(58) Field of Classification Search
None
See application file for complete search history.

(56) References Cited

U.S. PATENT DOCUMENTS

| | | | |
|---|---|---|---|
| 6,018,576 A * | 1/2000 | Croslin ........................ 379/22.03 |
| 6,393,535 B1 * | 5/2002 | Burton et al. ................... 711/158 |
| 7,127,545 B1 | 10/2006 | Nandi et al. .................... 710/316 |
| 7,260,737 B1 * | 8/2007 | Lent et al. ..................... 714/5.11 |
| 7,318,138 B1 | 1/2008 | Usgaonkar ....................... 711/163 |
| 7,668,981 B1 * | 2/2010 | Nagineni et al. ................. 710/38 |
| 7,730,274 B1 * | 6/2010 | Usgaonkar ....................... 711/163 |
| 7,783,779 B1 * | 8/2010 | Scales et al. .................... 709/240 |
| 7,937,617 B1 * | 5/2011 | Nagineni et al. ................. 714/13 |
| 8,060,775 B1 * | 11/2011 | Sharma et al. ................ 714/5.11 |
| 8,443,232 B1 * | 5/2013 | Nagineni et al. ................. 714/13 |
| 8,639,808 B1 * | 1/2014 | Vemuri et al. ................... 709/225 |
| 2003/0126315 A1 * | 7/2003 | Tan et al. .......................... 710/1 |
| 2003/0135782 A1 * | 7/2003 | Matsunami et al. .............. 714/5 |
| 2003/0172331 A1 * | 9/2003 | Cherian et al. ................ 714/712 |
| 2003/0188229 A1 * | 10/2003 | Lubbers et al. .................. 714/47 |
| 2004/0107300 A1 | 6/2004 | Padmanabhan et al. ........... 710/1 |
| 2004/0172636 A1 * | 9/2004 | Do et al. ......................... 719/321 |
| 2005/0097243 A1 * | 5/2005 | Yamashita et al. .............. 710/38 |

(Continued)

OTHER PUBLICATIONS

Ralph O. Weber. "Information technology—SCSI Primary Commands—3 (SPC-3)." May 2005. T10. Rev. 23. pp. 84-89.*

(Continued)

*Primary Examiner* — Nathan Sadler
(74) *Attorney, Agent, or Firm* — Campbell Stephenson LLP

(57) ABSTRACT

Various systems and methods can discover asymmetric logical unit (LUN) access (ALUA) preferences and/or state transitions and use those preferences and/or state transitions to control how a host accesses a LUN in an ALUA array. One such method involves detecting a preferred controller for a LUN and then detecting that a current owner controller of the LUN is not the preferred controller. In response, the method can initiate an ownership change from the current owner controller to the preferred controller. Another method involves detecting an initial state of a first controller with respect to a LUN. The method then detects a subsequent state of the first controller with respect to the LUN subsequent to detecting the initial state. The method can then cause a computing device to access the LUN via a second controller, in response to the subsequent state not being the active optimized state.

22 Claims, 5 Drawing Sheets

(56) References Cited

U.S. PATENT DOCUMENTS

| | | | |
|---|---|---|---|
| 2005/0120259 A1* | 6/2005 | Aoki | 714/5 |
| 2007/0234113 A1* | 10/2007 | Komatsu et al. | 714/8 |
| 2008/0126615 A1 | 5/2008 | Sinclair et al. | 710/38 |
| 2009/0132740 A1* | 5/2009 | Kai | 710/74 |
| 2010/0122111 A1* | 5/2010 | Allen et al. | 714/3 |

OTHER PUBLICATIONS

Symantec. "Veritas Storage Foundation 5.0 Dynamic Multi-pathing." May 2007. Symantec.*

Hewlett-Packard. "Configuration best practices for HP StorageWorks Enterprise Virtual Array (EVA) family and VMware vSphere 4." Nov. 2009. 4AA1-2185ENW.*

* cited by examiner

HOST DISCOVERY AND HANDLING OF ALUA PREFERENCES AND STATE TRANSITIONS

FIELD OF THE INVENTION

This invention relates to asymmetric logical unit (LUN) access (ALUA) arrays.

DESCRIPTION OF THE RELATED ART

Some types of storage arrays provide redundant paths to an array of storage units, which are referred to as logical units, or LUNs. Asymmetric logical unit (LUN) access (ALUA) is a standard mechanism of defining the behavior of a storage array. In an ALUA array, a host computing device can access each LUN within the array via any of several array controllers. However, at any given time, only one of the controllers is in an optimized state (and thus provides more optimal performance) with respect to a given LUN. Accordingly, if the host attempts to access a LUN via a controller that is not in the optimized state, performance may be adversely affected (e.g., providing decreased I/O throughput when accessing the LUN and/or the inability to access the LUN at all).

SUMMARY OF THE INVENTION

Various systems and methods for discovering and handling ALUA array controller state transitions are disclosed. One such method involves detecting a preferred controller for a logical unit (LUN) within an asymmetric LUN access (ALUA) array and then detecting that a current owner controller of the LUN is not the preferred controller. In response, the method can initiate an ownership change from the current owner controller to the preferred controller. Such a method can be performed by a computing device implementing a multipathing agent.

Detecting the preferred controller can involve accessing a static preference indicator provided by the ALUA array, detecting status information associated with the current owner controller of the LUN, and/or receiving information identifying the preferred controller from another node in a cluster, where the other node selected one of a plurality of controllers to be the preferred controller (e.g., according to a prespecified algorithm).

Another method involves detecting an initial state of a first controller in an ALUA array with respect to a LUN. This initial state is an active optimized state. The method then detects a subsequent state of the first controller with respect to the LUN subsequent to detecting the initial state. The method does not detect the subsequent state in response to receipt of a message indicating a state transition from the ALUA array (e.g., the method can thus operate in systems where such messages are not received by multipathing agents that perform the method). The method can then cause a computing device to access the LUN via a second controller, in response to the subsequent state not being the active optimized state. The second controller is in the active optimized state when the causing is performed.

Detecting the subsequent state can involve detecting an input/output performance decrease when the computing device accesses the LUN via the first controller, requesting information identifying a state of with the first controller with respect to the LUN from the ALUA array, and/or detecting an input/output error when the computing device accesses the LUN via the first controller. The act of detecting the subsequent state can be performed in response to the computing device receiving a request from an administrator.

An example of a system can include one or more processors and memory coupled to the processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
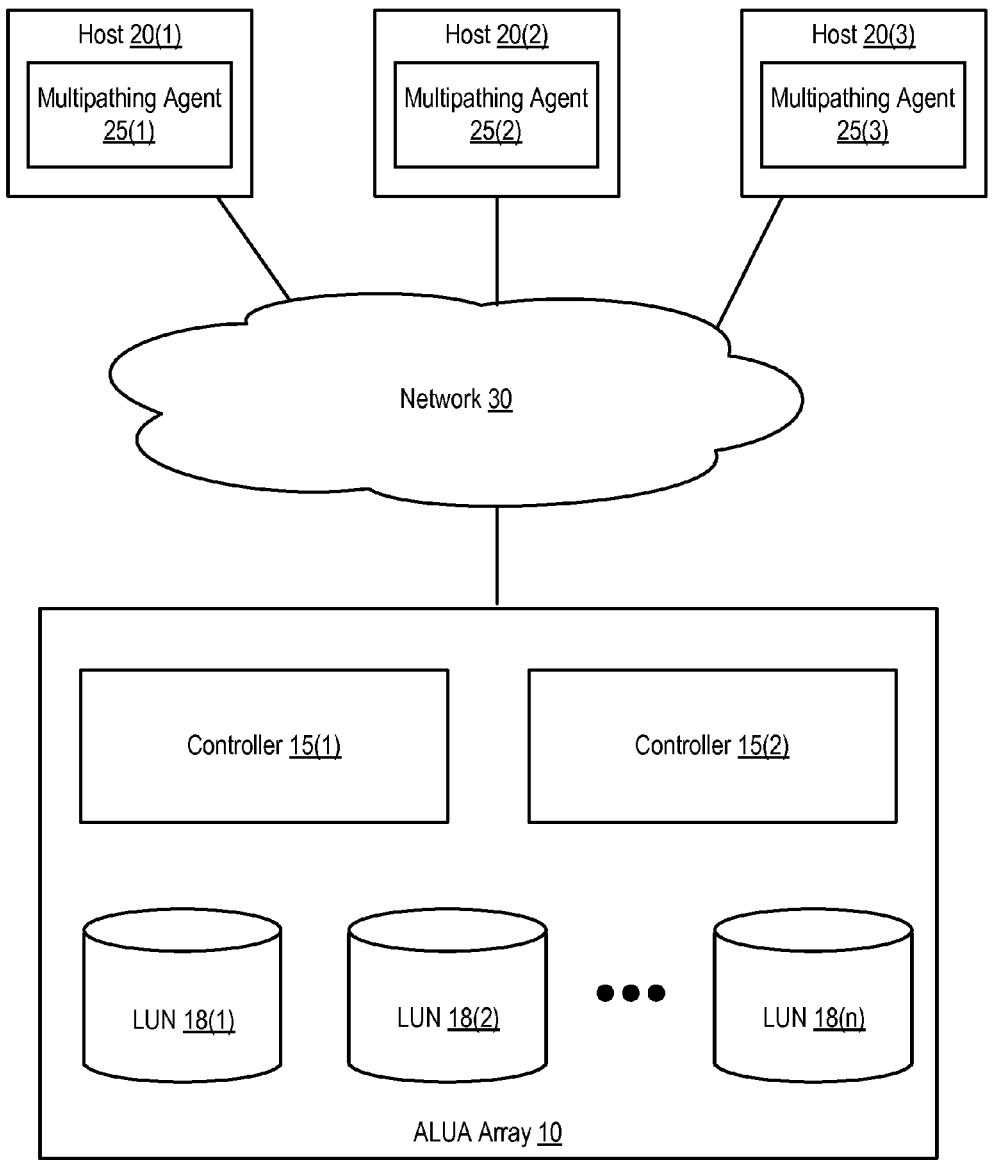
FIG. 1 is a block diagram of a system that includes an ALUA array, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a computing system includes an asymmetric logical unit (LUN) access (ALUA) array. In this system, each host device implements a multipathing agent (e.g., such as an agent configured to perform dynamic multipathing (DMP)) that is configured to detect changes in LUN ownership among the controllers in the ALUA array and/or to detect the preferred LUN ownership in the ALUA array. The multipathing agent can then use either or both detected sets of information to control how the host that includes that multipathing agent accesses a LUN within the ALUA.

As shown, the computer system of FIG. 1 includes an ALUA array 10 that is coupled to three host computing devices 20(1), 20(2), and 20(3) (collectively referred to as hosts 20) by a network 30. Each host computing device includes a multipathing agent. Thus, host 20(1) includes multipathing agent 25(1), host 20(2) includes multipathing agent 25(2), and host 20(3) includes multipathing agent 25(3).

ALUA array 10 includes two controllers 15(1) and 15(2) (collectively referred to as controllers 15) and several LUNs 18(1), 18(2), ..., 18(n) (collectively referred to as LUNs 18). While specific numbers of hosts, controllers, and LUNs have been shown in the example of FIG. 1, it is noted that the number of each type of component can vary among embodiments. Thus, some embodiments may include significantly more than three hosts. Similarly, some embodiments may include more than two controllers.

LUNs 18 are each logical storage devices. Each LUN can include at least a portion of each of one or more of a variety of different storage devices, including hard drives, compact discs, digital versatile discs, solid state drive (SSD) memory such as Flash memory, and the like.

Hosts 20 can each include any of a variety of different types of computing devices, including servers, personal computing devices, laptop computers, net books, personal digital assistants, cellular phones, or the like. Each host 20 is configured to access (e.g., create, read, write, or delete) information stored in one or more of the LUNs 18 within ALUA array 10. Each host 20 access a LUN 18 by communicating with one of controllers 15.

Initially, when the system of FIG. 1 starts up, an administrator or default algorithm for ALUA array 10 can be used to assign ownership of each LUN 18 to one of controllers 15. This initial configuration can also be referred to as the preference for the ALUA array 10. The original owner of a LUN can be referred to as the preferred owner of that LUN.

A controller 15 that owns a LUN 18 will maintain cache information (e.g., of recently accessed data being read from and/or written to that LUN) for the owned LUN. Accordingly, if a host 20 attempts to access that LUN via a non-owning controller, the non-owning controller will need to communicate with the owning controller in order to obtain the current cache for the LUN. This typically causes input/output (I/O) performance to decrease when LUNs are accessed via the non-owning controller.

The original assignment of LUN ownership to controllers can be made in a manner that load-balances the operation of the ALUA array. For example, the LUNs can be evenly divided among controllers. Alternatively, expected access patterns can be taken into account, such that controllers assigned ownership of more popular LUNs (e.g., LUNs expected to have more frequent access, LUNs expected to provide a higher quality of service, or other similar characteristics) are assigned relatively fewer LUNs than controllers assigned less-popular LUNs.

Each controller can operate in one of several states with respect to a given LUN. If the controller is operating properly and can provide access to that LUN, the controller is in an active state. If an active controller is currently the owner of that LUN, that controller is operating in the active optimized state (e.g., since accessing that LUN via the owning controller provides more optimal performance). If instead the active controller is not the current owner of that LUN, the controller is operating in the active unoptimized state (e.g., since accessing the LUN via the non-owning controller provides less optimal performance). A controller may also operate in a standby state (e.g., if not currently providing access to the LUN but being available as a failover controller) or an unavailable state (e.g., if failed or unable to access that LUN).

It is noted that the ownership of a LUN can transition from one controller to another. Thus, the current owner of a LUN may not be the preferred owner. While most ALUA arrays allow multipathing agents to access information identifying the current owner of a LUN, many ALUA arrays do not provide any information to multipathing agents to directly identify the preferred owner of a LUN. (As described below, some ALUA arrays do provide this information in the form of a preference indicator; however, this feature is not included in many ALUA arrays. Furthermore, while some ALUA arrays provide a preference indicator, not all maintain this indicator in a static state, such that the indicator may ultimately only identify the current, as opposed to the preferred, owner.)

The multipathing agents 25 within the hosts 20 can discover the multiple paths (via the different controllers) available to access each LUN from each host and control which path a respective host uses to access each LUN. If a failure or drop in performance is seen in the path that is currently being used to access a LUN, a multipathing agent can cause the host to begin using another path to access the LUN. Accordingly, the multipathing agents allow the hosts to benefit from the redundant paths provided by the ALUA array.

Additionally, the multipathing agents can discover the preferred controller ownership of LUNs. This allows the multipathing agents to closely follow the preferred assignment as changes occur in the ALUA array. For example, assume controller 15(1) is initially assigned ownership of LUN 18(1), making controller 15(1) the preferred owner of LUN 18(1). Subsequently, controller 15(1) fails, and ownership is transferred to controller 15(2). At some later time, controller 15(1) is repaired and returns to active operation. At this point, a multipathing agent can detect that the current controller being used to access the LUN is not the preferred controller for that LUN and that the preferred controller is available. In response, the multipathing agent can cause ownership of the LUN to be transferred back to the repaired controller 15(1) (e.g., by initiating a failback from controller 15(2) to controller 15(1)).

By detecting the preferred configuration and restoring operation to the preferred configuration when possible, the multipathing agents can help maintain the original configuration that was specified for the ALUA array. This can, for example, help maintain the load-balancing configuration originally established for the ALUA array.

In some embodiments, the multipathing agents can discover the preferred configuration for each LUN by simply accessing static preference information provided by the ALUA array for that LUN. This preference information identifies the preferred owner of that LUN. It is noted that each multipathing agent will see the same preference information and use that information in the same manner, so that all hosts can be configured to access a given LUN via the same controller.

In many embodiments, ALUA arrays do not provide preference information for each LUN. In some such embodiments, a multipathing agent can be configured to track the state transitions that occur for each LUN/controller pair. The tracked state transitions can then be used to identify the preferred configuration for the LUN. For example, if the multipathing agent has detected a single state transition (e.g., a failover from one controller to another, which transfers the active optimized state to the other controller) with respect to a given LUN, the multipathing agent can identify that the controller from which the LUN was failed over is the preferred owner of that LUN. Multiple transitions can similarly be tracked and used to identify the preferred owner. Each multipathing agent can track and use these state transitions in the same manner, such that all hosts can be configured to use the same controller to access a given LUN.

In some embodiments, state transitions can be detected by requesting status information (e.g., an asymmetric access state (AAS) value and/or an ALUA "STATUS CODE" value) from the controller for the LUN. The status information can collectively indicate whether the controller has changed state with respect to that LUN as well as the reason for the transition. If, for example, the AAS indicates that the controller is active unoptimized and STATUS CODE indicates that a transition has occurred for the LUN, the multipathing agent can detect that the controller is the preferred controller. If instead the controller is active optimized and STATUS CODE indicates that a transition has occurred, the multipathing agent can detect that the controller is not the preferred controller. If STATUS CODE indicates no status change has been detected, the multipathing agent can determine whether the controller is the preferred controller based upon its current state (e.g., preferred if currently the active optimized controller, as indicated by the AAS).

Some ALUA array implementations may not maintain status information such as a STATUS CODE value in a manner that allows the status information to be used to identify the preferred controller. In particular, the ALUA standard does not prescribe the STATUS CODE value after a failback (e.g., if controller 15(1) is the preferred controller and a failover happens from controller 15(1) to 15(2) and then back to controller 15(1)). Accordingly, some implementations of ALUA arrays do not reset the STATUS CODE value after failback. The failure to reset the STATUS CODE value after failback may prevent a multipathing agent from being able to identify the preferred controller in the manner described above.

In some embodiments, instead of tracking state transitions (e.g., if the ALUA array does not provide status information such as STATUS CODE values or if the ALUA array does not reset STATUS CODE values after failback), the multipathing agents can simply use a consistent algorithm to identify preferred configuration. The consistent algorithm is employed by all multipathing agents in the same system, such that all hosts can be configured to use the same controller to access a given LUN.

One example of a consistent algorithm is being configured to simply use the controller's characteristics (e.g., the controller's identifier) to select the owner of a LUN. For example, all of the multipathing agents can be configured to select the active controller with the lowest (or highest) identifier as the preferred owner of the LUN. Similarly, the multipathing agents can be configured to use the currently active optimized controller as the preferred owner of the LUN.

Another example of a consistent algorithm is one in which one host (e.g., the primary node in a cluster) is configured to select the preferred controller for a given LUN. That host then communicates its selection to all of the other hosts in the system, which will use the provided selection. That host can use, for example, a cluster communication protocol to communicate its selection.

Once the preferred configuration has been detected, the multipathing agent can determine whether the current owner of the LUN is the preferred owner of the LUN (e.g., by comparing the identifiers of the current owner controller and the preferred owner controller). If the current owner is not the preferred owner and the preferred owner is available (e.g., in an active or standby state), the multipathing agent can initiate an ownership transition from the current owner to the preferred owner and cause the host that includes the multipathing agent to begin accessing the LUN via the preferred owner. The multipathing agent can initiate these actions by, for example, initiating a failback operation to the preferred owner or by performing an auto-trespass operation (in embodiments that support auto-trespass) to access the LUN via the preferred owner.

In addition to (or instead of) being able to detect the preferred configuration of an ALUA array and to use that preferred configuration to control which path hosts use to access LUNs, the multipathing agents can detect when state transitions have occurred and use that information to control how a respective host accesses LUNs in the ALUA array.

As noted above, controller state transitions can occur that cause the ALUA array configuration to vary from its initial configuration. These state transitions can occur for a variety of reasons. For example, a state transition can occur due to controller failure, an administrator reconfiguring the ownership of a LUN, another host causing ownership of a LUN to be transferred, the ALUA array performing load balancing, an active trespass occurring, and the like.

One problem may occur in ALUA implementations in which the ALUA array notifications of controller state transitions do not reach the multipathing agents on the hosts. For example, while some ALUA arrays send a unit attention notification alert to hosts, this alert is often consumed by a lower software layer (e.g., a small computer system interface (SCSI driver) layer) than the layer in which the multipathing agent is implemented, such that the unit attention notification alert never reaches the multipathing agent.

In certain situations, a multipathing agent will nevertheless discover the state transition. For example, if the state transition occurs due to a controller failure, the multipathing agent will detect an error the next time the host attempts to access the LUN via the failed controller. Accordingly, the multipathing agent can then begin using the new active optimized controller to access the LUN.

In other situations, however, the multipathing agent may not discover the state transition. For example, if a state transition occurs but the formerly active optimized controller is still active and available, the multipathing agent can continue to access the LUN via that controller and will not see any error messages. As a result, the host may begin experiencing suboptimal performance when accessing the LUN.

In order to prevent situations in which a host accesses a LUN via an unoptimized controller, the multipathing agent can be configured to detect controller state transitions within the ALUA array. Initially, upon starting operation, the multipathing agent can identify the initial active optimized controller for each LUN. For example, the multipathing agent can access status information identifying a current owner of each LUN (e.g., an AAS code of a controller for a given LUN, as described above) and use that information to identify the active optimized controller for a given LUN. The multipathing agent can then store this information for future use.

At some subsequent time after startup, the multipathing agent can recheck the state of the initially active optimized controller for the LUN. Accordingly, if the state of that controller has transitioned, the multipathing agent will be able to detect the transition, despite not receiving any notification of the transition from the ALUA array. It is noted that the multipathing agent thus checks for state transitions without necessarily having first receiving a notification (e.g., in the form of a unit attention alert message) from the ALUA array.

In some embodiments, the multipathing agent can be configured to recheck the state by routinely (e.g., periodically or in response to predetermined stimuli) requesting the state of the controller from the array. For example, if controller 15(1) is initially found to be the active optimized controller for LUN 18(1), a multipathing agent can periodically request the AAS value (e.g., as described above) of controller 15(1) with respect to LUN 18(1). If the AAS value has changed, indicating that a transition has occurred, the multipathing agent can then identify the new active optimized controller for LUN 18(1).

In other embodiments, instead of routinely requesting the state of the controller, the multipathing agent can monitor the input/output (I/O) performance (e.g., in terms of throughput and/or error messages received while performing I/O) as the host accesses the LUN via the current controller. If a drop in I/O performance is detected (e.g., by detecting a drop in throughput and/or an error message), the multipathing agent can then request the state of the controller as described above.

In still other embodiments, the multipathing agent can provide an interface (e.g., a graphical user interface, command line interface, application programming interface, or the like) that allows an administrator and/or other user (e.g., a human user or application) to request that the multipathing agent recheck the state of the controller currently being used to access the LUN. This trigger can be implemented instead of and/or in addition to those described above.

If the multipathing agent detects that a transition has occurred and that the controller currently being used to access the LUN is no longer the active optimized controller for the LUN, the multipathing agent can cause the host to begin using the new active optimized controller to access the LUN.

Each multipathing agent can be configured to implement the same functionality to detect and handle state transitions (e.g., using one or more of the techniques described above). Accordingly, if a state transition occurs, the multipathing agents on each host will detect and handle the state transition in the same way. Thus, if the owner of a LUN changes, each of the hosts will respond in the same way and begin accessing the LUN via the same controller (the new owner of the LUN), even though those hosts may not communicate any information about this transition among themselves. Additionally, if an ownership change is triggered by one host, the other hosts can detect the transition and respond appropriately, even without being notified of the change by the host that triggered the change.

Figure 2:
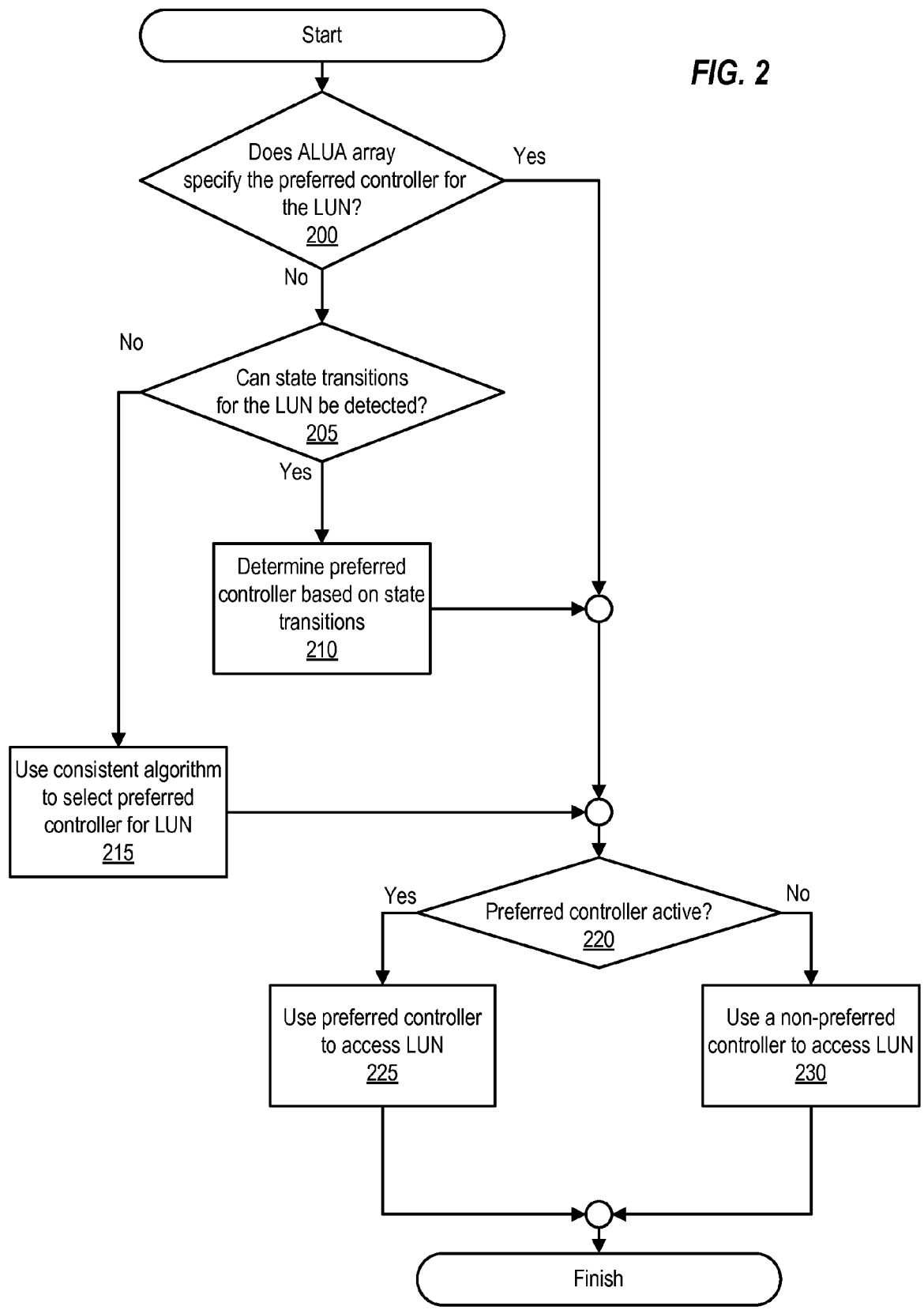
FIG. 2 is a flowchart of a method of discovering and handling preferences in an ALUA array, according to embodiments of the present invention.

FIG. 2 is a flowchart of a method of discovering the preferred controller for a LUN within an ALUA array and then using that information to cause a host to use the preferred controller (if available) to access the LUN. This method can be performed by a multipathing agent, like multipathing agents 25 of FIG. 1.

The method begins at 200, when the multipathing agent detects whether the ALUA array specifies the preferred controller for the LUN. This operation can be performed by requesting a preference indicator for the LUN from the ALUA array. Information about whether the preference indicator is static or not can be determined (e.g., by an administrator during system configuration) from the ALUA array specification.

If the ALUA array does not specify the preferred controller (e.g., if the ALUA array does not support a preference indicator and/or does not maintain the preference indicator statically), the multipathing agent can determine whether state transitions for the LUN can be detected, as shown at 205. For example, the multipathing agent can request status information, such as the AAS and STATUS CODE values described above, which is associated with both the LUN and a controller, from the ALUA array. This status information can collectively indicate whether the state of the controller with respect to that LUN has transitioned. Based upon the state transition(s) (if any) indicated by status information (and possibly the status information associated with other controllers with respect to that LUN), the multipathing controller can determine the preferred controller of the LUN, as indicated at 210. Various techniques for detecting the preferred controller based on such status information are described above with respect to FIG. 1.

If the information indicating the state transitions is not available and/or if the STATUS CODE values are not reset after failback (e.g., as indicated in the array specification), the multipathing agent can use a consistent algorithm to select a preferred controller for the LUN, as indicated at 215. This algorithm is consistent in that the same algorithm is used by each multipathing agent within the system, such that the results obtained by all multipathing agents will be consistent with each other throughout the system. Various consistent algorithms are described above with respect to FIG. 1.

Once the preferred controller for the LUN has been detected, the multipathing agent can then detect whether that preferred controller is currently active within the ALUA array, as shown at 220. For example, the multipathing agent can request the status of the preferred controller from the ALUA array. The multipathing agent can then cause the host that includes that multipathing agent to access the LUN via the preferred controller, if the preferred controller is available, as shown at 225. If the preferred controller is not the controller currently being used by the host, the multipathing agent can cause operation 225 to be performed by, for example, initiating a failback from the current controller to the preferred controller. If the preferred controller is not currently available, the multipathing agent can allow the host to access the LUN via a non-preferred controller, as indicated at 230.

The operations shown in FIG. 2 can be performed by each of several different multipathing agents and for each of several different LUNs. Some operations may be omitted in certain embodiments, and other embodiments may include other operations instead of and/or in addition to those depicted in FIG. 2. For example, in some embodiments, a multipathing agent may only be configured to perform some (as opposed to being configured to perform all) of operations 200, 205, and 215. For example, some multipathing agents may be configured to only detect the preferred controller by accessing information identifying state transitions (as opposed to also being able to detect the preferred controller based on a preference indicator and/or a consistent algorithm).

Figure 3:
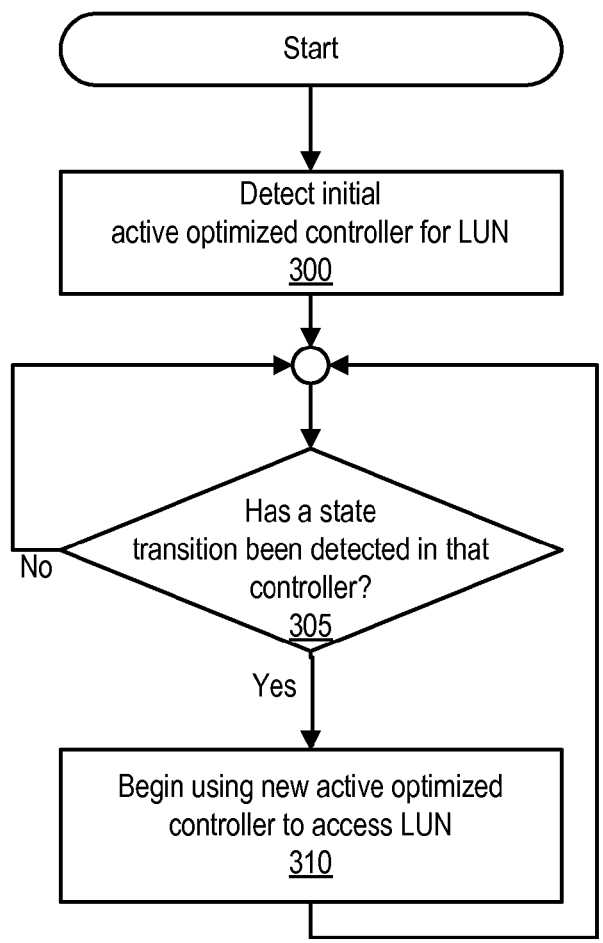
FIG. 3 is a flowchart of a method of discovering and handling ownership transitions in an ALUA array, according to one embodiment of the present invention.

FIG. 3 is a flowchart of a method of discovering and handling controller state transitions within an ALUA array. This method can be performed by a multipathing agent, like multipathing agent 25 of FIG. 1.

The method begins at 300, when the multipathing agent detects the current active optimized controller for a LUN within the ALUA array. The multipathing agent can perform this operation by requesting the identity of the active optimized controller for the LUN from the ALUA array. In some embodiments, operation 300 is performed in response to the multipathing agent being started, or in response to the multipathing agent detecting that the ALUA array has been started and/or made available to the multipathing agent.

Subsequently, the multipathing agent can monitor for transitions in the state of the controller identified at 300, as shown at 305. The multipathing agent can perform operation 305 in a variety of ways. For example, the multipathing agent can be configured to routinely (e.g., periodically) request the state (e.g., in the form of an AAS status code) of the controller from the ALUA array. Alternatively, the multipathing agent can be configured to monitor the I/O performance of access to the LUN via the controller. If a decrease in performance is seen, the multipathing agent can then request the state of the controller from the ALUA array. The multipathing agent can also be configured to request the state of the controller from the ALUA array in response to receiving a request to do so (e.g., from a user, application, or administrator). If a state transition has occurred, the multipathing agent can cause its host to begin accessing the LUN via the new active optimized (i.e., owner) controller for the LUN, as shown at 310.

As with the operations of FIG. 2, the operations of FIG. 3 can be performed by each of several different multipathing agents and for each of several different LUNs. Some operations may be omitted in certain embodiments, and other embodiments may include other operations instead of and/or in addition to those depicted in FIG. 3.

Figure 4:
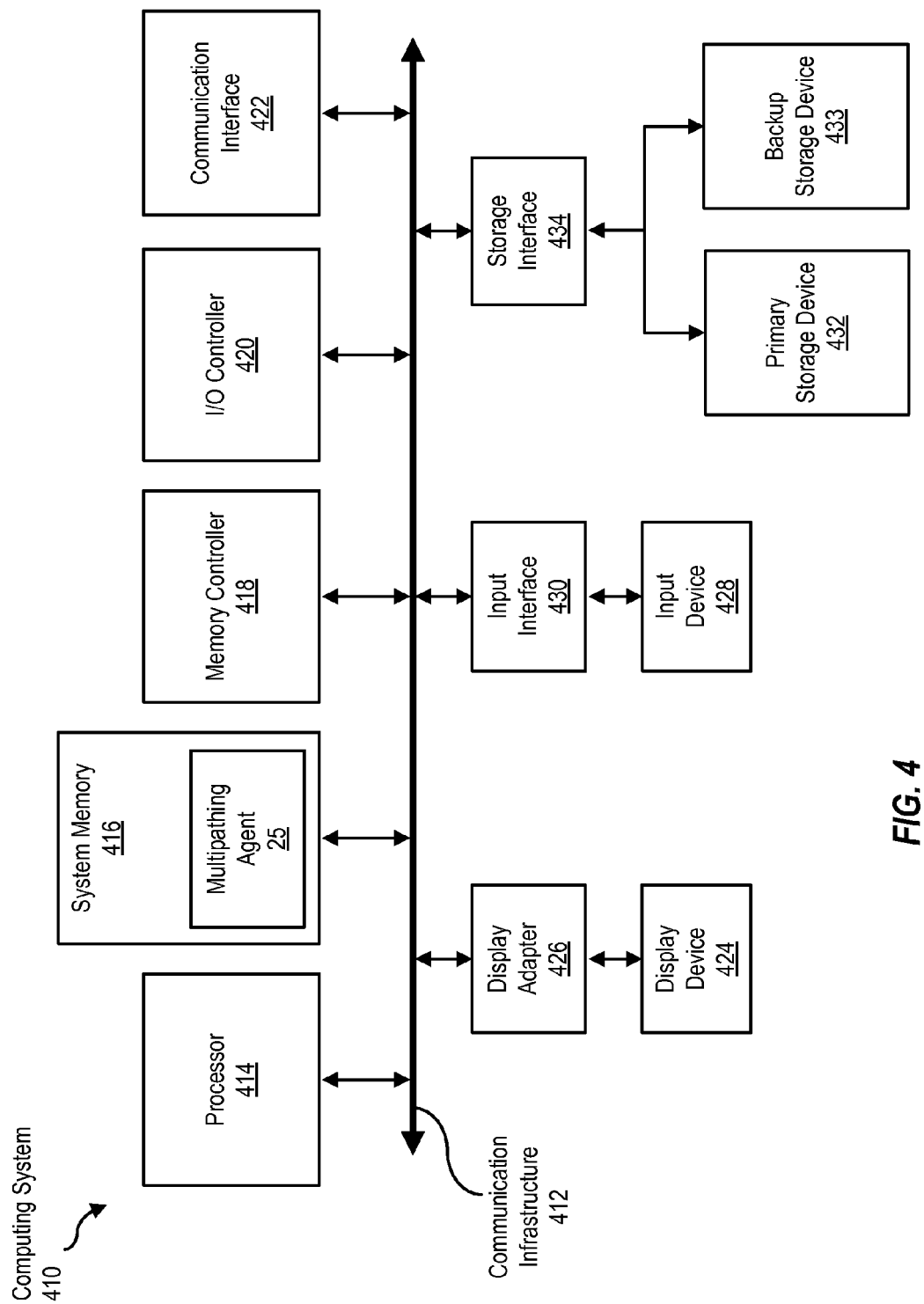
FIG. 4 is a block diagram of a computing device, illustrating how a host interface to an ALUA array can be implemented in software, according to one embodiment of the present invention.

FIG. 4 is a block diagram of a computing system 410 capable of implementing an archival module with a backup interface as described above. Computing system 410 broadly represents any single or multi-processor computing device or system capable of executing computer-readable instructions. Examples of computing system 410 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 410 may include at least one processor 414 and a system memory 416. By executing the software that implements a multipathing agent 25, computing system 410 becomes a special purpose computing device that is configured to detect preferences and/or state transitions within an ALUA array and to use that detected information to control how computing system 410 accesses a LUN within the ALUA array.

Processor 414 generally represents any type or form of processing unit capable of processing data or interpreting and executing instructions. In certain embodiments, processor 414 may receive instructions from a software application or module. These instructions may cause processor 414 to perform the functions of one or more of the embodiments described and/or illustrated herein. For example, processor 414 may perform and/or be a means for performing all or some of the operations described herein. Processor 414 may also perform and/or be a means for performing any other operations, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. In one example, program instructions implementing an archival module 50 with a multipathing agent 25 may be loaded into system memory 416.

In certain embodiments, computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller 418 may perform and/or be a means for performing, either alone or in combination with other elements, one or more of the operations or features described and/or illustrated herein.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, computing system 410 may also include at least one input device 428 coupled to communication infrastructure 412 via an input interface 430. Input device 428 generally represents any type or form of input device capable of providing input, either computer or human generated, to computing system 410. Examples of input device 428 include, without limitation, a keyboard, a pointing device, a speech recognition device, or any other input device.

As illustrated in FIG. 4, computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may each include a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. A storage device like primary storage device 432 can be used to implement an archival data repository and/or backup storage, as described above.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4.

Computing system 410 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 410 for storage in memory via a network such as the Internet or upon a carrier medium.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the embodiments described and/or illustrated herein. Additionally or alternatively, one or more of the embodiments described and/or illustrated herein may be implemented in firmware and/or hardware. For example, computing system 410 may be configured as an application specific integrated circuit (ASIC) adapted to implement one or more of the embodiments disclosed herein.

Figure 5:
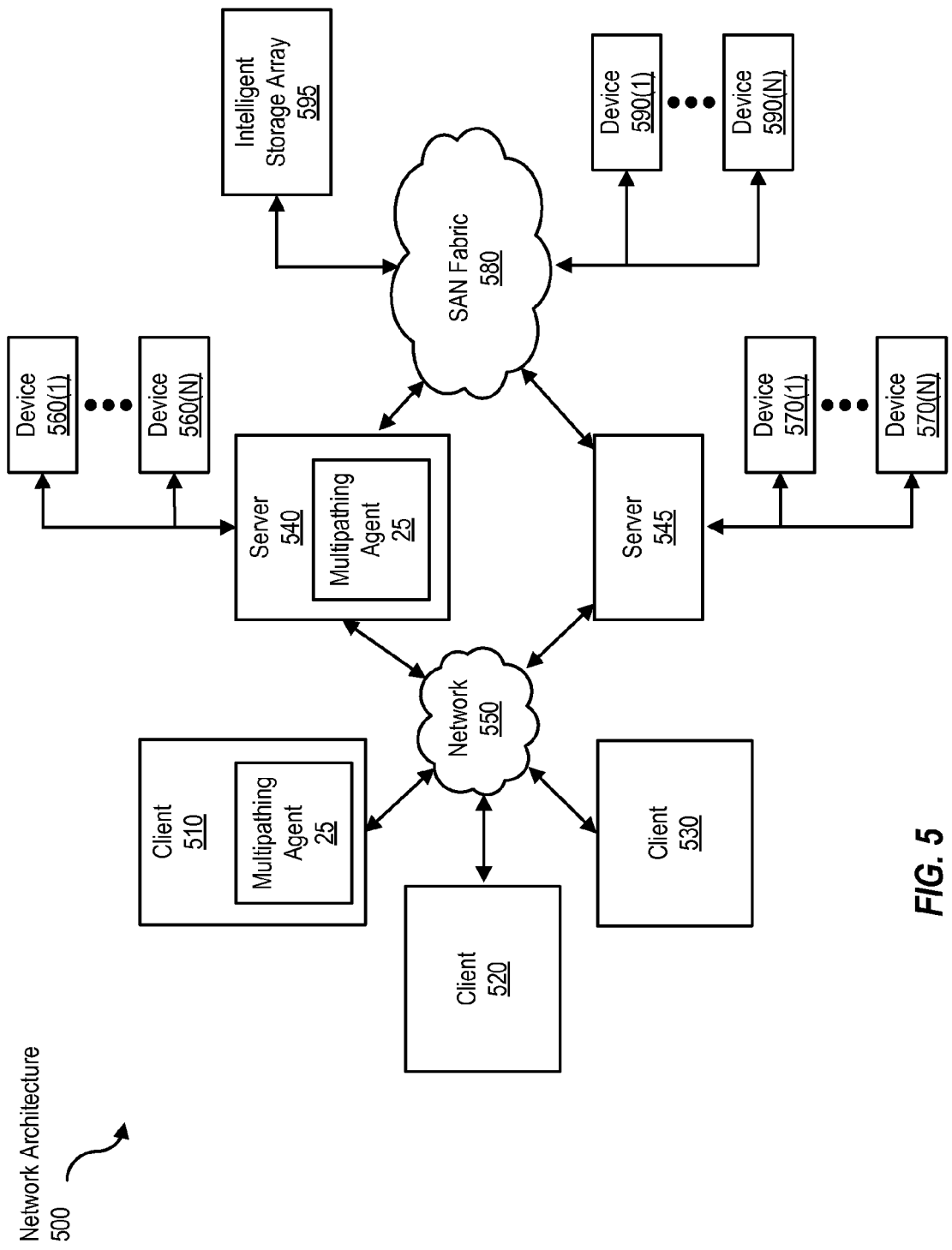
FIG. 5 is a block diagram of a networked system, illustrating how various computing devices can communicate via a network, according to one embodiment of the present invention.

FIG. 5 is a block diagram of a network architecture 500 in which client systems 510, 520, and 530 and servers 540 and 545 may be coupled to a network 550. Client systems 510, 520, and 530 generally represent any type or form of computing device or system.

Similarly, servers 540 and 545 generally represent computing devices or systems, such as application servers or database servers implemented on a computing device such as computing system 410 in FIG. 4, configured to provide various database services and/or run certain software applications. Network 550 generally represents any telecommunication or computer network including, for example, an intranet, a wide area network (WAN), a local area network (LAN), a personal area network (PAN), or the Internet. In one example, client systems 510, 520, and/or 530 and/or servers 540 and/or 545 may include a multipathing agent 25 as shown in FIGS. 1 and 4.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions and can be organized into an ALUA array as described above. In certain embodiments, storage devices 560(1)-(N) and storage devices 570(1)-(N) may represent network-attached storage (NAS) devices configured to communicate with servers 540 and 545 using various protocols, such as Network File System (NFS), Server Message Block (SMB), or Common Internet File System (CIFS).

Servers 540 and 545 may also be connected to a storage area network (SAN) fabric 580. SAN fabric 580 generally represents any type or form of computer network or architecture capable of facilitating communication between multiple storage devices. SAN fabric 580 may facilitate communication between servers 540 and 545 and a plurality of storage devices 590(1)-(N) and/or an intelligent storage array 595 (e.g., an ALUA array). SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to computing system 410 of FIG. 4, a communication interface, such as communication interface 422 in FIG. 4, may be used to provide connectivity between each client systems 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the embodiments disclosed herein may also be encoded as a computer program, stored in server 540, run by server 545, and distributed to client systems 510, 520, and 530 over network 550.

In some examples, all or a portion of the computing devices in FIGS. 1, 4, and 5 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a multipathing agent in FIG. 1 may transform behavior of a computing device in order to cause the computing device to rebalance access to an ALUA array based upon detected information about the preferences and/or state transitions within the ALUA array.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   detecting a preferred controller for a logical unit (LUN) within an asymmetric LUN access (ALUA) array, wherein
      a multipathing agent is unable to obtain information identifying the preferred controller from the ALUA array, and
      the detecting the preferred controller is based on an initial configuration of the ALUA array;
   detecting that a current owner controller of the LUN is not the preferred controller; and
   initiating an ownership change from the current owner controller to the preferred controller, wherein
      designation of the preferred controller as preferred is unaffected by the ownership change, and
      the detecting the preferred controller, the detecting the current owner controller, and the initiating are performed by a computing device implementing the multipathing agent.

2. The method of claim 1, wherein the detecting the preferred controller comprises detecting status information associated with the current owner controller of the LUN.

3. The method of claim 1, wherein the detecting the preferred controller comprises receiving information identifying the preferred controller from an other node in a cluster, wherein the other node selected one of a plurality of controllers to be the preferred controller.

4. The method of claim 1, wherein the detecting the preferred controller further comprises:
   tracking a plurality of state transitions.

5. The method of claim 1, wherein
   the detecting the preferred controller is performed in response to a multipathing agent starting operation.

6. The method of claim 1, further comprising:
   specifying the preferred controller, wherein
      the specifying is performed using a consistent algorithm, and
      the consistent algorithm is consistent with respect to a plurality of multipathing agents.

7. The method of claim 1, wherein
   the preferred controller is preferred by virtue of providing load balancing of the ALUA array.

8. A method comprising:
   detecting an initial state of a first controller in an asymmetric logical unit access (ALUA) array with respect to a logical unit (LUN), wherein the initial state is an active optimized state;
   detecting a subsequent state of the first controller with respect to the LUN, wherein the detecting the subsequent state is performed subsequent to the detecting the initial state, and wherein the detecting the subsequent state is not performed in response to receipt of a message indicating a state transition from the ALUA array;
   causing a computing device to access the LUN via a second controller, in response to the subsequent state not being the active optimized state, wherein the second controller is in the active optimized state when the causing is performed; and
   detecting whether the first controller is a preferred controller for the LUN based, at least in part, on tracking a transition from the initial state to the subsequent state, wherein
      designation of the preferred controller as preferred is unaffected by the transition, and
      a multipathing agent is unable to obtain information identifying the preferred controller from the ALUA array.

9. The method of claim 8, wherein the detecting the subsequent state comprises detecting an input/output performance decrease when the computing device accesses the LUN via the first controller.

10. The method of claim 8, wherein the detecting the subsequent state comprises requesting information identifying a state of the first controller with respect to the LUN from the ALUA array.

11. The method of claim 8, wherein the detecting the subsequent state is performed in response to the computing device receiving a request from an administrator.

12. The method of claim 8, wherein the detecting the subsequent state comprises detecting an input/output error when the computing device accesses the LUN via the first controller.

13. A non-transitory computer readable storage medium comprising program instructions executable to:
   detect a preferred controller for a logical unit (LUN) within an asymmetric LUN access (ALUA) array, wherein
      a multipathing agent is unable to obtain information identifying the preferred controller from the ALUA array, and
      the detecting the preferred controller is based on an initial configuration of the ALUA;

detect that a current owner controller of the LUN is not the preferred controller; and initiate an ownership change from the current owner controller to the preferred controller, wherein
designation of the preferred controller as preferred is unaffected by the ownership change.

14. The non-transitory computer readable storage medium of claim 13, wherein detection of the preferred controller comprises detecting status information associated with the current owner controller of the LUN.

15. A non-transitory computer readable storage medium comprising program instructions executable to:
detect an initial state of a first controller in an asymmetric logical unit access (ALUA) array with respect to a logical unit (LUN), wherein the initial state is an active optimized state;
detect a subsequent state of the first controller with respect to the LUN, wherein detection of the subsequent state is performed subsequent to detection of the initial state, and wherein detection of the subsequent state is not performed in response to receipt of a message indicating a state transition from the ALUA array;
cause a computing device to access the LUN via a second controller, in response to the subsequent state not being the active optimized state, wherein the second controller is in the active optimized state when the computing device is caused to access the LUN via the second controller; and
detect whether the first controller is a preferred controller for the LUN based, at least in part, on tracking a transition from the initial state to the subsequent state, wherein
designation of the preferred controller as preferred is unaffected by the transition, and
a multipathing agent is unable to obtain information identifying the preferred controller from the ALUA array.

16. The non-transitory computer readable storage medium of claim 15, wherein detection of the subsequent state comprises detection of an input/output performance decrease when the computing device accesses the LUN via the first controller.

17. The non-transitory computer readable storage medium of claim 15, wherein detection of the subsequent state is performed by requesting information identifying a state of the first controller with respect to the LUN from the ALUA array.

18. A system comprising:
one or more processors; and
memory coupled to the one or more processors, wherein the memory stores program instructions executable by the one or more processors to:
detect a preferred controller for a logical unit (LUN) within an asymmetric LUN access (ALUA) array, wherein
a multipathing agent is unable to obtain information identifying the preferred controller from the ALUA array, and
the detecting the preferred controller is based on an initial configuration of the ALUA;
detect that a current owner controller of the LUN is not the preferred controller; and
initiate an ownership change from the current owner controller to the preferred controller, wherein
designation of the preferred controller as preferred is unaffected by the ownership change.

19. The system of claim 18, wherein detection of the preferred controller comprises detecting status information associated with the current owner controller of the LUN.

20. A system comprising:
one or more processors; and
memory coupled to the one or more processors, wherein the memory stores program instructions executable by the one or more processors to:
detect an initial state of a first controller in an asymmetric logical unit access (ALUA) array with respect to a logical unit (LUN), wherein the initial state is an active optimized state;
detect a subsequent state of the first controller with respect to the LUN, wherein detection of the subsequent state is performed subsequent to detection of the initial state, and wherein detection of the subsequent state is not performed in response to receipt of a message indicating a state transition from the ALUA array;
cause a computing device to access the LUN via a second controller, in response to the subsequent state not being the active optimized state, wherein the second controller is in the active optimized state when the computing device is caused to access the LUN via the second controller; and
detect whether the first controller is a preferred controller for the LUN based, at least in part, on tracking a transition from the initial state to the subsequent state, wherein
designation of the preferred controller as preferred is unaffected by the transition, and
a multipathing agent is unable to obtain information identifying the preferred controller from the ALUA array.

21. The system of claim 20, wherein detection of the subsequent state comprises detection of an input/output performance decrease when the computing device accesses the LUN via the first controller.

22. The system of claim 20, wherein detection of the subsequent state is performed by requesting information identifying a state of with the first controller with respect to the LUN from the ALUA array.

* * * * *